(12) United States Patent
Kano et al.

(10) Patent No.: US 12,508,248 B2
(45) Date of Patent: Dec. 30, 2025

(54) THERAPEUTIC AGENT FOR PROTOTHECA DISEASE

(71) Applicants: SEREN PHARMACEUTICALS INC., Tokyo (JP); NIHON UNIVERSITY, Tokyo (JP)

(72) Inventors: Rui Kano, Tokyo (JP); Osamu Ogawa, Tokyo (JP)

(73) Assignees: SEREN PHARMACEUTICALS INC., Tokyo (JP); NIHON UNIVERSITY, Tokyo (JP)

( * ) Notice: Subject to any disclaimer, the term of this patent is extended or adjusted under 35 U.S.C. 154(b) by 1026 days.

(21) Appl. No.: 17/625,982

(22) PCT Filed: Jul. 9, 2020

(86) PCT No.: PCT/JP2020/026904
§ 371 (c)(1),
(2) Date: Jan. 10, 2022

(87) PCT Pub. No.: WO2021/006317
PCT Pub. Date: Jan. 14, 2021

(65) Prior Publication Data
US 2022/0378752 A1 Dec. 1, 2022

(30) Foreign Application Priority Data
Jul. 11, 2019 (JP) .................................. 2019-128864

(51) Int. Cl.
| | | |
|---|---|---|
| *A61K 31/427* | (2006.01) | |
| *A61K 31/00* | (2006.01) | |
| *A61K 31/661* | (2006.01) | |
| *A61K 31/675* | (2006.01) | |
| *A61P 31/00* | (2006.01) | |
| *A61P 31/10* | (2006.01) | |
| *A61P 43/00* | (2006.01) | |

(52) U.S. Cl.
CPC ............ *A61K 31/427* (2013.01); *A61K 31/00* (2013.01); *A61K 31/661* (2013.01); *A61K 31/675* (2013.01); *A61P 31/00* (2018.01); *A61P 31/10* (2018.01); *A61P 43/00* (2018.01)

(58) Field of Classification Search
None
See application file for complete search history.

(56) References Cited

FOREIGN PATENT DOCUMENTS

CA   2986854 A1   5/2019

OTHER PUBLICATIONS

Miura et.al. ((2019), In vitro algaecide effect of itraconazole and ravuconazole on *prototheca* species, Medical Mycology, 58, 8455-847 (Year: 2019).*
Peyton et.al. ((2015), Triazole Antifungals: a Review, Drug of Today, 51, 705-718 (Year: 2015).*
Tortorano et.al. ((2008), In vitro activity of conventional antifungal drugs and natural essences against the yeast-like alga Prototheca, Journal of Antimicrobial Chemotherapy, 61, 1312-1314 (Year: 2008).*
Sobukawa, Hideo. et al., "In vitro susceptibility of Ptototheca zofii genotypes 1 and 2." Med. Mycol. 2011; 49:222-224.
Kano, Rui. Bovine prototheca mastitis. The Journal of Farm Animal in Infectious Diseases, 2016, vol. 5, No. 4, pp. 139-144.
Inoue, Maki et al. "Case report of cutaneous protothecosis caused by Prototheca wickerhamii designated as genotype 2 and current status of human prototheccosis in Japan." Journal of Dermatology. 2018, vol. 45, No. 1, pp. 67-71.
Clemons, K. V. et al. "Efficacy of Ravuconazole in Treatment of Systemic Murine Histoplasmosis." Antimicrob. Agents Chemother., 2002, vol. 46, No. 3, pp. 922-924.
Watanabe, Shinichi. "A new dawn of treatment for tinea unguium." Journal of the Japanese Association for Infectious Diseases, Mar. 1, 2019, vol. 93, Special edition, p. 436.
Yamaguch, Hideyo. "Pharmacology and pharmacokinetics of fosravuconazole, a new oral drug for tinea unguium." Journal of the Japan Organization of Clinical Dermatologists, 2018, vol. 35, No. 5, pp. 753-755.
Miura, Ayumi et al., "In vitro algaecide effect of itraconazole and ravuconazole on *prototheca* species." Medical Mycology, Nov. 27, 2019, vol. 58(2020), No. 6, pp. 845-847.
International Search Report in International Application No. PCT/JP2020/026904, Aug. 18, 2020.
Written Opinion of the International Searching Authority in International Application No. PCT/JP2020/026904, Aug. 18, 2020.
Extended European Search Report in European counterpart 20837817.4 dated Jun. 12, 2023.

* cited by examiner

*Primary Examiner* — Juliet C Switzer
*Assistant Examiner* — Dawanna Shar-Day White
(74) *Attorney, Agent, or Firm* — Kim IP Law Group LLC

(57) ABSTRACT

The present invention has an object of providing a composition that is effective for the treatment of a prototheca disease. According to the present invention, a composition containing ravuconazole as an active ingredient, which is administered to an animal suffering from a prototheca disease caused by Prototheca wickerhamii or Prototheca zopfii, is provided.

17 Claims, No Drawings

THERAPEUTIC AGENT FOR PROTOTHECA DISEASE

CROSS-REFERENCE TO RELATED APPLICATIONS

This application relates to, and claims the benefit and priority from International Patent Application No. PCT/JP2020/026904 filed on Jul. 9, 2020, and published as International Publication WO 2021/006317 on Jan. 14, 2021, which claims the benefit and priority from Japanese Patent Application No. 2019-128864 filed on Jul. 11, 2019, the entire disclosures of all of which are incorporated herein by reference in their entireties.

TECHNICAL FIELD

The present invention relates to a novel therapeutic or preventive agent for prototheca diseases.

BACKGROUND ART

Prototheca is a kind of algae, but does not photosynthesize since it has lost chloroplasts secondarily. Thus, since it is a heterotrophic organism that receives an external energy source, prototheca is saprotrophically or parasitically nourished. Prototheca lives in moist environments such as soils, plant surfaces, animal digestive organs (host intestinal flora), lakes, marshes and sewage around the world, but it is also a zoonotic pathogen that infects humans and animals.

The infectious disease caused by prototheca is called a prototheca disease and is a zoonotic disease that infects dogs, cats, livestock and humans. Prototheca infectious diseases have been attracting attention as emerging infectious diseases in recent years, and their countermeasure requires interdisciplinary and international cooperation. The human prototheca disease in Japan was reported first in 1983, and has been found occasionally thereafter.

Prototheca is thought to be transmitted from the environment because it inhabits plant surfaces, soils, lakes and marshes, but it is also a pathogen of opportunistic infections because it is resident in the digestive tract of animals. Therefore, animal prototheca diseases have been reported in all over the world including Japan as mastitis-causing microorganisms in animals including dogs and cats, and dairy cows.

The prototheca disease in dogs and cats causes acute to chronic inflammatory pathogens of the skin, but is also a fatal disease that spreads to systemic organs, including the central nervous system. In the case of cats, skin infections are found exclusively, and the route of infection is often skin injury. On the other hand, dogs are said to have more severe disseminated (deep seated) prototheca diseases. The prototheca disease is also considered to be an opportunistic infection, and it is thought that the onset of the prototheca disease is likely to increase with the onset of bacterial substitution due to the administration of antibacterial agents for diarrhea and the increasing frequency of administration of immunosuppressants and anticancer agents. In the case of immunodeficiency, there is also a concern about the transition from skin infection to dissemination. In addition, bovine prototheca mastitis causes lowered milk quality and zoonotic diseases. As described above, an animal prototheca disease is regarded as a problem in industrial animals and pet animals, and there is an urgent need to establish methods for controlling and treating it.

The most well-known pathogens of prototheca diseases are Prototheca wickerhamii and Prototheca zopfii. Prototheca wickerhamii is the most common pathogen for humans and small animals, and Prototheca zopfii causes a sporadic prototheca disease in humans and small animals.

Although antifungal agents amphotericin B (AMB) and azoles have been used to treat this disease, the clinical response in the treatment of humans and animals is generally weak. From the previous study by the present inventors on susceptibility to AMB, gentamicin (GM), kanamycin (KM) and itraconazole (ITZ) in vivo, it has been shown that these drugs are not effective against several strains of Prototheca wickerhamii and Prototheca zopfii (Non-Patent Document 1).

The present inventors have reported susceptibility to kanamycin (KM), gentamicin (GM), amphotericin B (AMB), and itraconazole (ITZ) using a bovine prototheca mastitis isolate (Non-Patent Document 2). As a result, it has been reported that Genotype 2 of Prototheca zopfii, which is the pathogen causing mastitis, has low drug susceptibility, which is one cause making it difficult to treat mastitis with the drugs.

CITATION LIST

Non-Patent Document

Non-Patent Document 1: Sobukawa H. et al., In vitro susceptibility of Ptototheca zofii genotypes 1 and 2, Med. Mycol. 2011; 49:222-224

Non-Patent Document 2: Rui Kanou et al., The Journal of Farm Animal in Infectious Disease, Vol. 5, No. 4, 2016, p 139-143

SUMMARY OF THE INVENTION

Technical Problem

The present invention has an object of providing a novel therapeutic agent or preventive agent which is effective against an infectious disease caused by prototheca.

Solution to Problem

The present inventors have intensively studied, and resultantly found that prototheca shows high susceptibility to ravuconazole, completing the present invention. The present invention includes the following aspects.

[1] A composition for the treatment or prevention of a prototheca disease, comprising as an active ingredient ravuconazole or a pharmaceutically acceptable salt, hydrate or solvate thereof.

[2] The composition according to the above [1], which is used for the treatment or prevention of a prototheca disease affecting dogs or cats.

[3] The composition according to the above [1], which is used for the treatment or prevention of a prototheca disease affecting cows (preferably a bovine prototheca mastitis).

[4] The composition according to the above [1], which is a pharmaceutical composition for the treatment or prevention of a prototheca disease affecting humans.

[5] The composition according to any one of the above [1] to [4], wherein the prototheca disease is a prototheca disease caused by Prototheca wickerhamii.

[6] The composition according to any one of the above [1] to [4], wherein the prototheca disease is a prototheca disease caused by Prototheca zopfii.

[7] A composition for the treatment or prevention of a prototheca disease, comprising as an active ingredient a prodrug of ravuconazole (preferably fosravuconazole) or a pharmaceutically acceptable salt, hydrate or solvate thereof.

[8] The composition according to the above [7], which is used for the treatment or prevention of a prototheca disease affecting dogs or cats.

[9] The composition according to the above [7], which is used for the treatment or prevention of a prototheca disease affecting cows.

[10] The composition according to the above [7], which is a pharmaceutical composition for the treatment or prevention of a prototheca disease affecting humans.

[11] The composition according to any one of the above [7] to [10], wherein the prototheca disease is a prototheca disease caused by Prototheca wickerhamii.

[12] The composition according to any one of the above [7] to [10], wherein the prototheca disease is a prototheca disease caused by Prototheca zopfii.

[13] A method for treating a prototheca disease, comprising administering a therapeutically effective amount of ravuconazole or a pharmaceutically acceptable salt, hydrate or solvate thereof to an animal suffering from the prototheca disease.

[14] The treatment method according to the above [13], wherein the animal is a dog or a cat.

[15] The treatment method according to the above [13], wherein the animal is a cow.

[16] The treatment method according to the above [13], wherein the animal is human.

[17] The treatment method according to anyone of the above [13] to [16], wherein the prototheca disease is a prototheca disease caused by Prototheca wickerhamii.

[18] The treatment method according to anyone of the above [13] to [16], wherein the prototheca disease is a prototheca disease caused by Prototheca zopfii.

[19] A method for treating a prototheca disease, comprising administering a therapeutically effective amount of a prodrug of ravuconazole (preferably fosravuconazole) or a pharmaceutically acceptable salt, hydrate or solvate thereof to an animal suffering from the prototheca disease.

[20] The treatment method according to the above [19], wherein the animal is a dog or a cat.

[21] The treatment method according to the above [19], wherein the animal is a cow.

[22] The treatment method according to the above [19], wherein the animal is human.

[23] The treatment method according to anyone of the above [19] to [22], wherein the prototheca disease is a prototheca disease caused by Prototheca wickerhamii.

[24] The treatment method according to anyone of the above [19] to [22], wherein the prototheca disease is a prototheca disease caused by Prototheca zopfii.

Advantageous Effect of the Invention

The present invention provides a composition for effective treatment or prevention of a prototheca disease.

DESCRIPTION OF EMBODIMENTS

Hereinafter, the present invention will be illustrated with reference to the exemplary embodiments along with preferred methods and materials which can be used in practice of the present invention. However, the present invention is not limited to the embodiments described below. Unless otherwise specified in the sentences, any technical terms and scientific terms used in the present specification have the same meaning as those generally understood by those of ordinary skill in the art to which the present invention belongs. Any materials and methods equivalent or similar to those described in the present specification can be used for practicing the present invention. All publications and patents cited herein in connection with the present invention described herein are incorporated by reference, for example, as indicating methodology, materials, etc. that can be used in the present invention.

In the present specification, when the expression "X to Y" is used, it is used to include X as the lower limit and Y as the upper limit, or to include X as the upper limit and Y as the lower limit.

In the present specification, the term "ravuconazole" in the context of a composition for treatment or prevention, or a treating method or a prevention method is used to include all of ravuconazole, its pharmaceutically acceptable salts, hydrates and solvates. Similarly, in the present specification, the term "fosravuconazole" is used to include all of fosravuconazole, its pharmaceutically acceptable salts, hydrates and solvates.

One aspect of the present invention is a composition (preferably a pharmaceutical composition) comprising ravuconazole as an active ingredient, which is intended to be used in animals suffering from a prototheca disease.

Another aspect of the present invention is a composition (preferably a pharmaceutical composition) comprising ravuconazole as an active ingredient intended for use in animals suffering from a prototheca disease caused by Prototheca wickerhamii.

Another aspect of the present invention is a composition (preferably a pharmaceutical composition) comprising ravuconazole as an active ingredient intended for use in animals suffering from a prototheca disease caused by Prototheca zopfii.

One aspect of the present invention is a composition (preferably a pharmaceutical composition) comprising a prodrug of ravuconazole, preferably fosravuconazole, as an active ingredient, which is intended to be used in animals suffering from a prototheca disease.

Another aspect of the invention is a composition (preferably a pharmaceutical composition) comprising a prodrug of ravuconazole, preferably fosravuconazole, as an active ingredient, intended for use in animals suffering from a prototheca disease caused by Prototheca wickerhamii.

Another aspect of the invention is a composition (preferably a pharmaceutical composition) comprising a prodrug of ravuconazole, preferably fosravuconazole, as an active ingredient, intended for use in animals suffering from a prototheca disease caused by Prototheca zopfii.

Ravuconazole has been reported as a compound showing an antifungal activity against various fungal pathogens including Candida, Aspergillus, and Cryptococcus. Ravuconazole is an azole-based antifungal compound having the following structural formula (I).

[Chemical Formula 1]

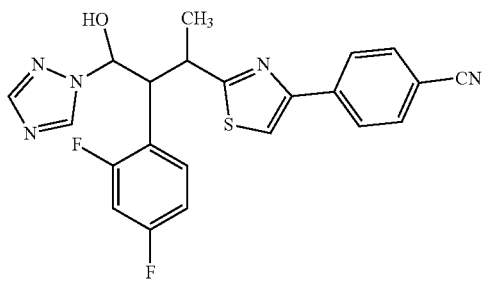

A method for producing ravuconazole is disclosed in, for example, Organic Process Research & Development 2009, 13, 716-728, and it can be produced with reference to such a disclosure. Such a disclosure constitutes apart of the present specification by reference. In the production, those skilled in the art can appropriately use techniques known in the art concerned without limitation.

Fosravuconazole is a compound having the following structural formula (II) in which the hydroxyl group of ravuconazole is substituted with a phosphomonooxymethyl ester.

[Chemical Formula 2]

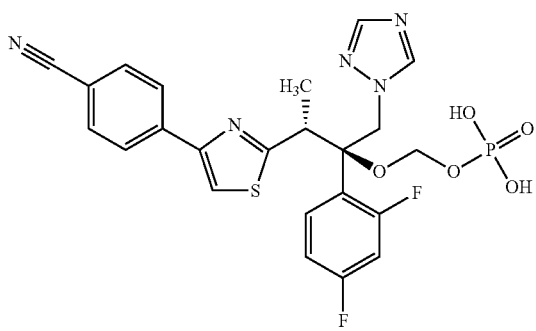

Fosravuconazole is a prodrug of ravuconazole that is rapidly converted to ravuconazole when administered to humans. The L-lysine ethanol adduct of fosravuconazole is currently marketed as a drug for nail tenea. Fosravuconazole can also be synthesized appropriately using techniques known in the art.

The ravuconazole contained in the composition of the present invention may be a pharmaceutically acceptable salt thereof. "Pharmaceutically acceptable salt" refers to any non-toxic salt formed from the compound represented by the formula (I). Suitable salts include, for example, but not limited to, inorganic acid salts such as hydrochloride, hydrobromide, hydroiodide, phosphate, hydrogen phosphate, sulfate, etc., organic acid salts such as acetate, trifluoroacetate, malate, succinate, tartrate, lactate, citrate, maleate, fumarate, sorbate, ascorbate, salicylate, phthalate, methyl sulfonate, trifluoromethyl sulfonate, benzene sulfonate, etc., inorganic salts such as ammonium salt, etc., alkali metal salts such as sodium salt, potassium salt, etc., alkaline earth metal salts such as calcium salt, magnesium salt, etc., salts of acidic groups such as carboxylic acid salt, etc., salts with organic bases such as lower alkylamines such as methylamine, ethylamine, cyclohexylamine, etc., substituted lower alkylamines such as diethanolamine, triethanolamine, etc., and amino acid salts such as glycine salt, lysine salt, arginine salt, ornithine salt, glutamic acid salt, aspartic acid salt, etc.

The ravuconazole contained in the composition of the present invention may also be a hydrous product such as a hydrate or a solvate and the like, formed from the compound represented by the formula (I). As used herein, the term "hydrate" means a compound or salt thereof that further contains a stoichiometric or non-stoichiometric amount of water bound by non-covalent intermolecular forces. As used herein, the term "solvate" means a compound or salt thereof that further contains a stoichiometric or non-stoichiometric amount of solvent that is bound by non-covalent intermolecular forces. Preferred solvents are volatile, non-toxic and/or trace amounts of solvents that are acceptable for administration to animals, preferably human. Examples thereof are, but not limited to, water, ethanol, and the like.

The fosravuconazole contained in the composition of the present invention may be a pharmaceutically acceptable salt thereof. "Pharmaceutically acceptable salt" refers to any non-toxic salt formed from the compound represented by the formula (II). Specifically, the above-mentioned salts described in relation to ravuconazole can be mentioned.

The fosravuconazole contained in the composition of the present invention may be a hydrous product such as a hydrate or a solvate and the like, formed from the compound represented by the formula (II). The hydrate and solvate have the same meaning as above. Preferred solvents are volatile, non-toxic and/or trace amounts of solvents that are acceptable for administration to animals, preferably human, and include, but not limited to, water, ethanol and the like.

The fosravuconazole contained in the composition of the present invention as an active ingredient is preferably an L-lysine ethanol adduct of fosravuconazole.

The composition of the present invention may contain a prodrug of ravuconazole as an active ingredient. The "prodrug" of ravuconazole includes both "prodrug ester" and "prodrug ether". The "prodrug ester" includes esters and carbonates formed by reacting a hydroxyl of the compound represented by the formula (I) with any of an alkyl, an alkoxy, or an aryl-substituted acylating agent or a phosphorylating agent by a method known to those skilled in the art to generate an acetate, pivalate, methyl carbonate, benzoate, amino acid ester, phosphate, half acid ester (e.g., malonate, succinate, or glutarate) and the like. As used herein, the term "prodrug ether" includes both phosphate acetals and glucosides of compounds represented by the above-mentioned formula, which are produced using methods known to those skilled in the art.

The prodrug refers to a compound that is converted to the parent compound represented by the formula (I) in vivo, for example, by hydrolysis in blood.

The prodrug of ravuconazole contained in composition of the present invention may be a pharmaceutically acceptable salt thereof. The prodrug of ravuconazole contained in the composition of the present invention may also be a hydrous product such as a hydrate, or a solvate and the like.

The prodrug contained in the composition of the present invention is preferably fosravuconazole, and more preferably a fosravuconazole-L-lysine ethanol adduct.

The composition of the present invention may include one or more pharmaceutically acceptable carriers and, as appropriate, other antifungal agents, in addition to either of ravuconazole or a prodrug of ravuconazole.

As used herein, the term "pharmaceutically acceptable carrier" includes any and all of solvents, dispersion media, coating agents, antioxidants, chelating agents, preservatives (e.g., antibacterial agents), surfactants, buffering agents, tonicity adjusting agents, absorption delaying agents, salts, drug stabilizers, excipients, diluents, binders, disintegrating agents, sweetening agents, fragrances, abundance agents, dyes, etc., and combinations thereof, as known to those skilled in the art. Unless any of the carriers is incompatible with the active ingredient in the present invention, it can be used in the composition or the therapeutic method of the present invention.

As used herein, the term "therapeutically effective amount" refers to ravuconazole or a prodrug of ravuconazole (preferably, fosravuconazole) in an amount sufficient to produce a therapeutic effect, when administered to an animal in need of treatment. The therapeutically effective amount varies depending on the subject and the disease symptoms to be treated, the weight and age of the subject, the severity of the disease symptoms, the administration method, and the like, and can be easily determined by those skilled in the art.

As used herein, the term "subject" is an animal in need of treatment and typically, the animal is a mammal. For example, it refers to a primates (e.g., a human), a cat, a dog, a cow, a sheep, a goat, a horse, a rabbit, a rat, mouse, a koala, and the like. In certain embodiments, the animal as the subject is preferably a human, a cat, a dog, or a cow.

The subject to which the composition of the present invention is administered is an animal suffering from prototheca disease. Preferably, it is an animal suffering from prototheca disease caused by Prototheca wickerhamii or Prototheca zopfii.

The composition of the present invention containing either of ravuconazole (the formula (I)) or a prodrug of ravuconazole (e.g., fosravuconazole (the formula (II))) can be formulated according to known methods for formulating pharmaceutical compositions. Representative pharmaceutical compositions may include the pharmaceutically acceptable carriers described above. The use of these carriers is well known in the art. Further, a method for preparing a pharmaceutical composition containing an active ingredient is well known in the art.

The composition of the present invention can be formulated to suit a specific route of administration according to the intended use. Routes of administration include, but are not limited to, oral, parenteral, intravenous, intradermal, subcutaneous, transdermal, inhalation, topical, transmucosal, rectal, or eye-drop administration. The compositions of the present invention can be formulated in solid or liquid form. The solid form includes, but are not limited to, tablets, capsules, pills, granules, powders, suppositories, patches, ointments, creams, gels and the like. The liquid form includes, but are not limited to, solutions, suspensions, emulsions, lotions, sprays and the like. The composition of the present invention is usually administered, but not limited to, orally, intravenously, intramuscularly or transdermally.

The composition of the present invention formulated for oral administration may be either a liquid composition or a solid composition. For liquid formulations, a composition can be prepared using liquid carriers such as water, glycols, oils, alcohols and analogous materials. For solid formulations such as tablets and capsules, a composition can be prepared using solid carries such as starches, sugars, kaolin, ethyl cellulose, calcium carbonate and sodium carbonate, calcium phosphate, talc, lactose and the like, while generally containing a binding agent, a disintegrating agent and analogous materials together with a lubricant such as calcium stearate. Tablets and capsules are the most advantageous oral dosage forms because they are easy to administer. For ease of administration and dosage uniformity, it is particularly advantageous to formulate the composition in unit dosage form. The composition in unit dosage form constitutes one aspect of the invention.

The compositions of the present invention can be prepared for transdermal administration, for example, as patches, ointments, or creams. The patch may be either a tape agent or a poultice agent, and can be prepared, for example, by using an acrylic pressure-sensitive adhesive, a rubber-based pressure-sensitive adhesive, or a silicone-based pressure-sensitive adhesive as abase material, and compounding ravuconazole or a prodrug of ravuconazole as an active ingredient into the base material, though not limited to this. Further, according to a conventional method, an additive used in patches can be added for stabilizing the active ingredient, controlling the elution property, and controlling the adhesiveness. When prepared as an ointment or cream, it can be prepared according to a conventional method using a hydrophobic base (for example, vaseline) or a hydrophilic base (for example, an emulsifier or polyethylene glycol). Additionally, various additives used in the art can be added. In addition, the composition of the present invention can be used in any dosage form such as a gel, a liquid, a suspension, a spray, etc., and preparation into these dosage forms can be carried out using materials and methods used in the art.

The composition of the present invention can also be, for example, an eye-drop for eye-drop administration. The eye drops may be any of aqueous eye drops, suspension eye drops, oil-based eye drops, eye ointments, and extemporaneously dissolved eye drops, and preparation into these dosage forms can be carried out using materials and methods used in the art.

The composition of the present invention may be prepared for injection, and can take a form of solution, emulsion or suspension in an oily or aqueous vehicle such as 0.85% sodium chloride or 5% dextrose in water. It can also contain formulating agents such as suspending agents, stabilizers and/or dispersants. Buffering agents and additives (saline or glucose, etc.) can be added to make the solution isotonic. For drip intravenous administration, the compounds can also be dissolved in alcohol/propylene glycol or polyethylene glycol. These compositions can also be provided in unit dosage forms, preferably in ampoules or in multi-dose containers, with preservatives added. Alternatively, the active ingredient can be in powder form to reconstitute with a suitable vehicle prior to administration.

The dose of the compound in the composition of the present invention is appropriately selected depending on the type of disease, the symptom of the subject to be administered, the age, the administration route and the like. In the case of administration to humans, for example, usually 10 to 5000 mg, preferably 20 to 2000 mg, more preferably 50 to 500 mg, and still more preferably 100 to 200 mg per day of the compound may be administrated, once to twice per day, for several days to several weeks, in some cases, several months to 1 year, continuously or intermittently, though not limited to these. In the case of administration to cats, for example, usually 2 to 1000 mg, preferably 10 to 100 mg, and more preferably 20 to 40 mg per day of the compound may be administrated, once to twice per day, for several days to several weeks, in some cases, several months to 1 year, continuously or intermittently, though not limited to these. In the case of administration to dogs, for example, usually 2 to 1000 mg, preferably 10 to 500 mg, more preferably 20 to 100 mg per day of the compound may be administered, once or twice a day, for several days to several weeks, and in some cases, for several months to 1 year, continuously or intermittently, though not limited to these. In the case of administration for the treatment of bovine protothecal mastitis, for example, usually 10 to 10000 mg, preferably 20 to 5000 mg, more preferably 50 to 1000 mg per day of the compound may be administered, once or twice a day, for several days to several weeks, and in some cases, for several months to 1 year, continuously or intermittently, though not limited to these.

The composition of the present invention may also contain other antifungal agents in addition to ravuconazole or fosravuconazole. Other antifungal agents include, but are not limited to, natamycin, rimocidin, nystatin, amphotericin B, candicine, hamycin, perimycin, miconazole, ketoconazole, clotrimazole, econazole, omoconazole, bifonazole, butoconazole, fenticonazole, isoconazole, oxiconazole, sertaconazole, sulconazole, tioconazole, fluconazole, fosfluconazole, itraconazole, isavuconazole, posaconazole, voriconazole, terconazole, albaconazole, abafungin, terbinafine, naftifine, butenafine, amorolfine, anidulafungin, caspofungin, micafungin, ciclopirox, tolnaftate, or flucytosine. Preferably, kanamycin (KM), gentamicin (GM), amphotericin B (AMB), and itraconazole (ITZ) can be mentioned, although not sufficiently effective when used alone. Therefore, the composition of the present invention contains, in addition to ravuconazole or a prodrug of ravuconazole (preferably fosravuconazole), a combination of two or more active ingredients including other antifungal agents (combination agent).

The composition of the present invention can also be administered in combination with other drugs for combination therapy. The combinational administration includes sequential, simultaneous or parallel administration of two drugs. The other drugs that can be administered in combination include the antifungal agents described above.

The present invention also includes a method for the treatment of a protothecal disease, comprising administering a therapeutically effective amount of ravuconazole or a prodrug of ravuconazole (preferably fosravuconazole) to an animal suffering from the protothecal disease, preferably a dog, cat, cow, or human. The present invention also includes a method for the treatment of a protothecal disease, comprising administration to a patient in combination with other known drugs. The other drugs include the antifungal agents mentioned above (combination).

EXAMPLES

Hereinafter, the present invention will be specifically described with reference to examples, but the present invention is not limited to the following examples.

Clinical and environmental isolates of Prototheca wickerhamii, Prototheca zopfii, and Prototheca blaskeae were used to test their susceptibility to ravuconazole.

(Example 1) Preparation of Isolate

For Prototheca wickerhamii, isolates (1 cat strain and 2 dog strains) were obtained from dogs and cats suffering from a protothecal disease. For Prototheca zopfii, bovine protothecal mastitis isolates (Genotype 2, 10 strains) and environmental isolates (Genotype 1, 10 strains) were obtained. For Prototheca blaskeae, a protothecal mastitis isolate (1 strain) was obtained. For Prototheca zopfii, the drug susceptibility was tested also on Genotype 1 established strain (SAG20063$^T$) and Genotype 2 established strain (SAG2021$^T$).

The isolates were maintained on Yeast Extract-Peptone-Dextrose agar (YPD: 1% yeast extract, 2% peptone, 2% dextrose, 2% agar) and tested for antifungal susceptibility. The susceptibility of the isolates to the antifungal agents itraconazole (ITZ, Merck KGA) and ravuconazole (RVZ, selenium pharma) was measured using a trace liquid dilution method (broth microdilution assay) according to the CLSI M27-A3 guideline. The minimum inhibitory concentration (MIC) was measured after culturing at 32 degrees for 72 hours. MIC was defined as the lowest concentration that induces significant inhibition of growth (inhibition of about 50% or more). As a control, Candida parapsilosis ATCC 22019 obtained from ATCC was used, and the MIC assay of the CLSI M27-A3 test was performed. The results of MIC of each isolate in the CLSI M27-A3 test are shown in the following table.

TABLE 1

| Species | Strain number | Origin (genotype) | MICs (mg/L) RVZ[a] | ITZ[b] |
|---|---|---|---|---|
| P. wickerhamii | NUBS[c]19001 | feline protothecosis | 0.03 | >32 |
| P. wickerhamii | NUBS19002 | canine protothecosis | 0.03 | >32 |
| P. wickerhamii | NUBS19003 | canine protothecosis | 0.03 | 4 |
| P. zopfii | SAG2063$^T$ | type strain of (GT1) | 0.03 | 1.5 |
| P. zopfii | NUBS19004 | environment (GT1) | 0.03 | 1 |
| P. zopfii | I1 | environment (GT1) | 0.03 | 2 |
| P. zopfii | I3 | environment (GT1) | 0.03 | 0.25 |
| P. zopfii | W3 | environment (GT1) | 0.03 | 4 |
| P. zopfii | W20 | environment (GT1) | 0.03 | 4 |
| P. zopfii | S2 | environment (GT1) | 0.03 | 32 |
| P. zopfii | S3 | environment (GT1) | 0.03 | 8 |
| P. zopfii | S29 | environment (GT1) | 0.03 | >32 |
| P. zopfii | S36 | environment (GT1) | 0.03 | 16 |
| P. zopfii | S42 | environment (GT1) | 0.03 | 8 |
| P. zopfii | SAG2021$^T$ | type strain of GT2 | 0.125 | >32 |
| P. zopfii | A7 | bovine protothecal mastitis (GT2) | 0.125 | 32 |
| P. zopfii | A8 | bovine protothecal mastitis (GT2) | 0.03 | 4 |
| P. zopfii | A9 | bovine protothecal mastitis (GT2) | 0.03 | >32 |
| P. zopfii | A10 | bovine protothecal mastitis (GT2) | 0.03 | >32 |
| P. zopfii | A11 | bovine protothecal mastitis (GT2) | 0.25 | >32 |
| P. zopfii | A13 | bovine protothecal mastitis (GT2) | 0.125 | >32 |
| P. zopfii | A14 | bovine protothecal mastitis (GT2) | 0.03 | >32 |
| P. zopfii | A15 | bovine protothecal mastitis (GT2) | 0.0625 | >32 |

TABLE 1-continued

| Species | Strain number | Origin (genotype) | MICs (mg/L) RVZ[a] | ITZ[b] |
|---|---|---|---|---|
| P. zopfii | A16 | bovine protothecal mastitis (GT2) | 0.03 | 8 |
| P. zopfii | A17 | bovine protothecal mastitis (GT2) | 0.25 | 4 |
| P. blaskeae | NUBS19005 | bovine protothecal mastitis | 0.03 | 32 |

[a]RVZ: ravuconazole;
[b]ITZ: itraconazole;
[c]NUBS: Nihon University College of Bioresource Sciences.

The MIC of the three clinical isolates of Prototheca wickerhamii was 4 to >32 mg/L for itraconazole, while it was 0.03 mg/L for ravuconazole. The MIC of 11 isolates of Genotype 1 of Prototheca zopfii was 0.25 to >32 mg/L for itraconazole, while it was 0.03 mg/L for ravuconazole. The MIC of 11 isolates of Genotype 2 of Prototheca zopfii was 4 to >32 mg/L for itraconazole, while it was 0.03 to 0.25 mg/L for ravuconazole. The MIC of one isolate of Prototheca blaskeae was 32 mg/L for itraconazole, while it was 0.03 mg/L for ravuconazole.

The MIC of the azole drug for the control strain Candida parapsilosis ATCC 22019 was 0.125 for itraconazole, while it was 0.03 mg/L for ravuconazole which is within the recommendations set forth in the CLSI M27-A3 assay attachment.

These results indicate that ravuconazole is more effective (in other words, anti-algae effect is higher) than itraconazole against pathogen of prototheca species. Further, ravuconazole showed stronger activity as compared with publicly known results of the effects of kanamycin (KM), gentamicin (GM), amphotericin B (AMB) and itraconazole (ITZ) against prototheca species: Prototheca wickerhamii, Prototheca zopfii, and Prototheca Blaskeae.

These results indicate that ravuconazole may possibly be a first-line drug in the treatment of human and animal prototheca diseases.

The foregoing merely illustrates objects and subjects of the present invention, and is not intended to be limiting the accompanying Claims. Without departing from the accompanying Claims, various modifications and alterations to the described embodiments will be apparent to those skilled in the art in view of the teachings herein.

INDUSTRIAL APPLICABILITY

The composition containing ravuconazole provided by the present invention is useful as a therapeutic drug for prototheca diseases.

The invention claimed is:

1. A method for treating a prototheca disease in an animal, comprising administering a therapeutically effective amount of ravuconazole or a pharmaceutically acceptable salt, hydrate or solvate thereof to the animal suffering from the prototheca disease.

2. The method for treating a prototheca disease in an animal according to claim 1, wherein the animal is selected from the group consisting of human, dog, cat and cow.

3. The method for treating a prototheca disease in an animal according to claim 1, wherein the animal is human.

4. The method for treating a prototheca disease in an animal according to claim 1, wherein the animal is cow.

5. The method for treating a prototheca disease in an animal according to claim 1, wherein the prototheca disease is a prototheca disease caused by Prototheca wickerhamii.

6. The method for treating a prototheca disease in an animal according to claim 2, wherein the prototheca disease is a prototheca disease caused by Prototheca wickerhamii.

7. The method for treating a prototheca disease in an animal according to claim 1, wherein the prototheca disease is a prototheca disease caused by Prototheca zopfii.

8. The method for treating a prototheca disease in an animal according to claim 2, wherein the prototheca disease is a prototheca disease caused by Prototheca zopfii.

9. A method for treating a prototheca disease in an animal, comprising administering a therapeutically effective amount of a prodrug of ravuconazole or a pharmaceutically acceptable salt, hydrate or solvate thereof to the animal suffering from the prototheca disease.

10. The method for treating a prototheca disease in an animal according to claim 9, wherein the prodrug of ravuconazole is fosravuconazole.

11. The method for treating a prototheca disease in an animal according to claim 10, wherein the animal is selected from the group consisting of human, dog, cat and cow.

12. The method for treating a prototheca disease in an animal according to claim 10, wherein the animal is human.

13. The method for treating a prototheca disease in an animal according to claim 10, wherein the animal is cow.

14. The method for treating a prototheca disease in an animal according to claim 10, wherein the prototheca disease is a prototheca disease caused by Prototheca wickerhamii.

15. The method for treating a prototheca disease in an animal according to claim 11, wherein the prototheca disease is a prototheca disease caused by Prototheca wickerhamii.

16. The method for treating a prototheca disease in an animal according to claim 10, wherein the prototheca disease is a prototheca disease caused by Prototheca zopfii.

17. The method for treating a prototheca disease in an animal according to claim 11, wherein the prototheca disease is a prototheca disease caused by Prototheca zopfii.

* * * * *